(No Model.) 3 Sheets—Sheet 1.

E. INGLETON.
STEAM PLOWING APPARATUS.

No. 382,983. Patented May 15, 1888.

WITNESSES.
Edwin L. Yewell.
John Enders Jr.

INVENTOR.
Edward Ingleton.
per Geo. C. Robb.
Attorney.

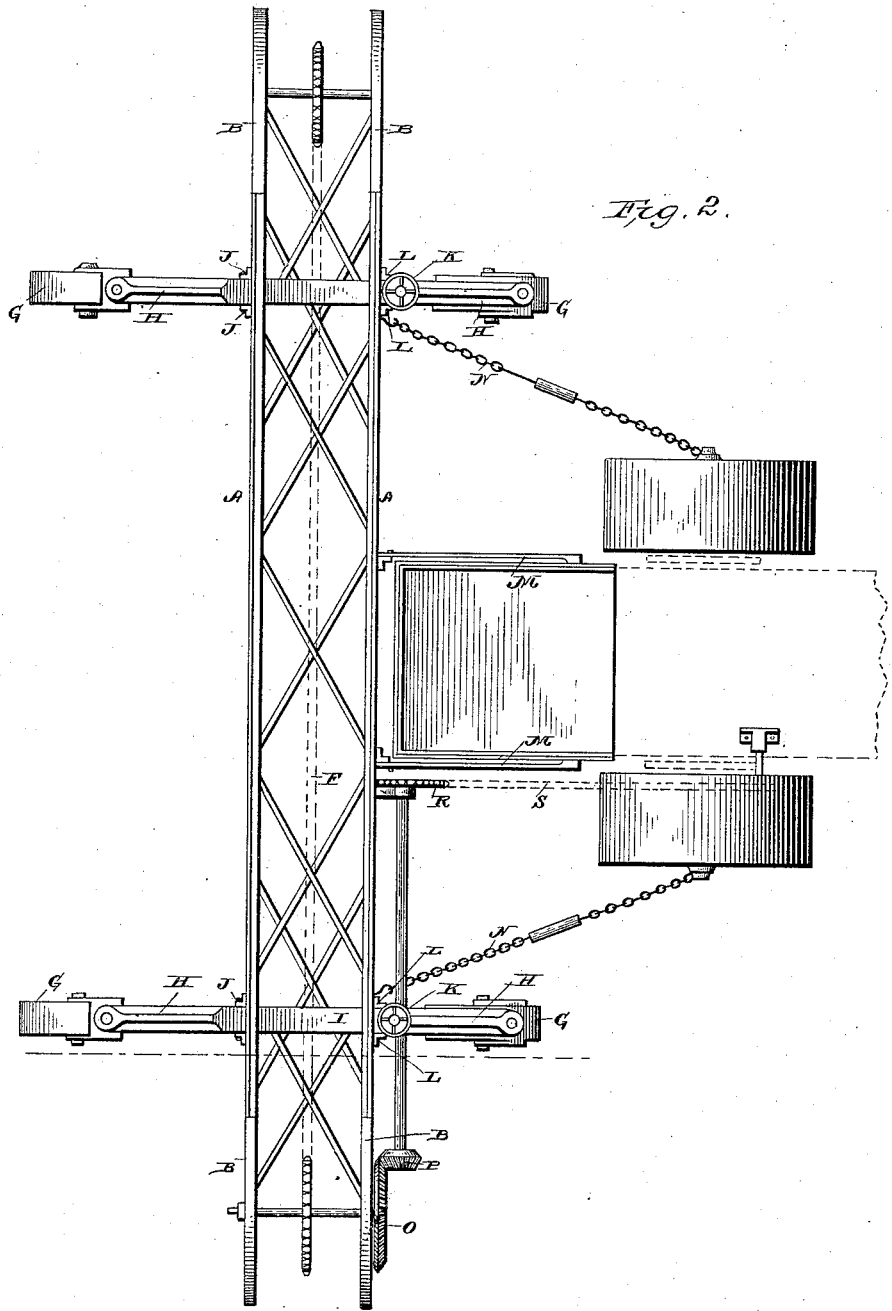

(No Model.) 3 Sheets—Sheet 3.

E. INGLETON.
STEAM PLOWING APPARATUS.

No. 382,983. Patented May 15, 1888.

WITNESSES.
Edwin I. Yewell.
John Enders Jr.

INVENTOR,
Edward Ingleton
per Geo. C. Robb.
Attorney.

N. PETERS, Photo-Lithographer, Washington, D. C.

UNITED STATES PATENT OFFICE.

EDWARD INGLETON, OF TORONTO, ONTARIO, CANADA.

STEAM PLOWING APPARATUS.

SPECIFICATION forming part of Letters Patent No. 382,983, dated May 15, 1888.

Application filed May 18, 1886. Serial No. 202,587. (No model.) Patented in Canada January 26, 1885, No. 20,970.

*To all whom it may concern:*

Be it known that I, EDWARD INGLETON, of the city of Toronto, Province of Ontario, Canada, engineer, have invented certain new and useful Improvements in Steam Plowing Apparatus, (for which I have obtained a patent in the Dominion of Canada, No. 20,970, and bearing date January 26, 1885,) of which the following is a specification.

The object of my invention is to design and produce a steam plowing apparatus which can be operated by as few attendants as possible, or by only one on favorable ground, and which will utilize as much as possible of the steam-power in actual plowing, only a small portion of the power being required for moving the apparatus over the ground. This latter object is attained by having a number of plows arranged to travel on a comparatively long frame, which is connected to the steam traction-engine and so arranged that the direction of the motion of the plows is nearly at right angles to the direction in which the traction-engine travels. The result of this is that the plows may travel much faster than the whole apparatus does, and a furrow the length of the space between two of the plows is cut while the apparatus travels a distance equal to the width of the furrow. It will be apparent that by this arrangement a great saving of power is effected, as the heavy mass of the traction-engine and frame moves at a slow speed over the unplowed ground while comparatively light plows travel at a high speed, doing the plowing in a rapid and efficient manner.

The accompanying drawings illustrate the mechanism by which I attain these objects.

Figure 1:
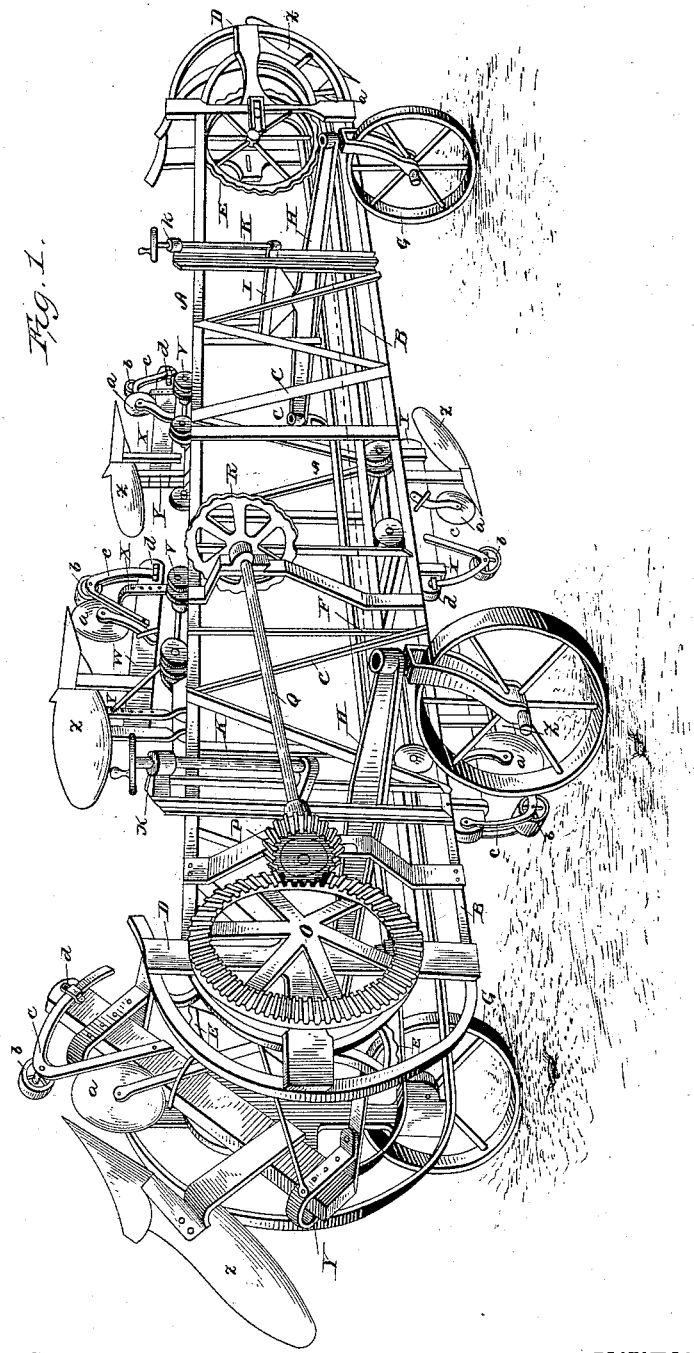
Figure 4:
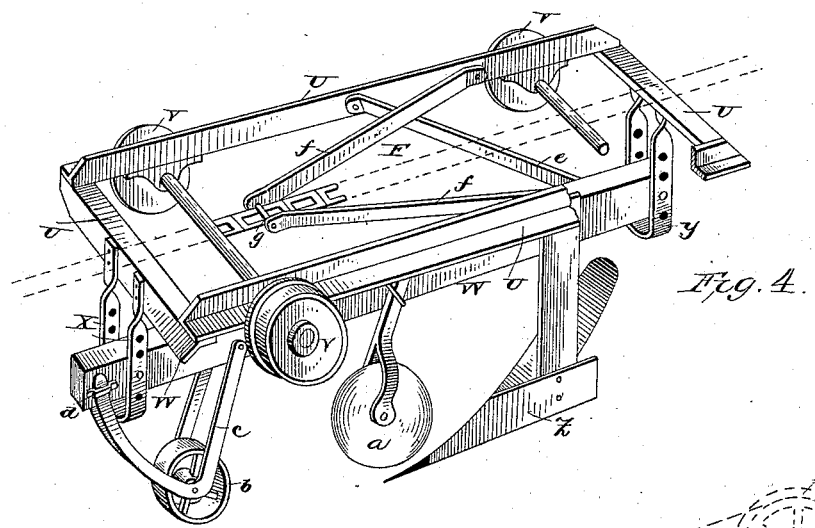
Figure 3:
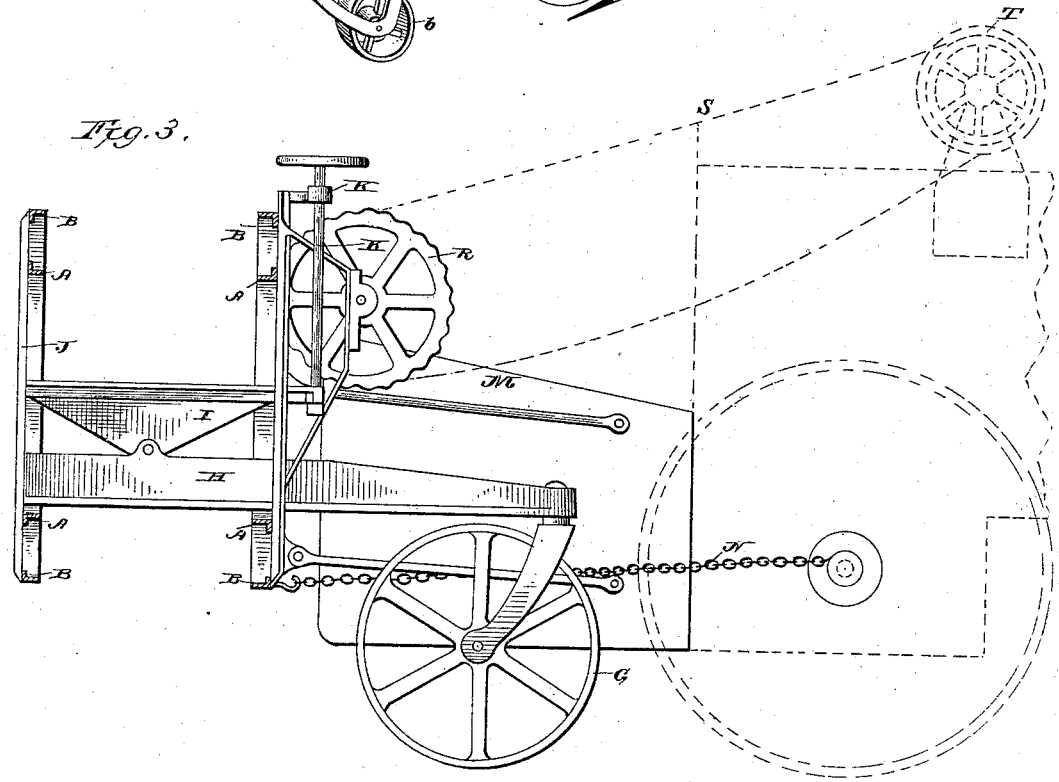

Figure 1 is a perspective view of the plowing apparatus. Fig. 2 is a plan of the plow-frame, showing the manner of connecting it to the rear of the traction-engine. Fig. 3 is a side section through *x y*, showing the connection between the plow-frame and the traction-engine. Fig. 4 is an enlarged perspective view of the plow-carriage.

Before describing the operation of my improved apparatus I shall, by aid of the drawings, describe its construction and mode of connection to the steam traction-engine from which the power is obtained.

I make no claim for any improvement in the traction-engine, but merely point out that the engine must be constructed and geared so that the two distinct operations of drawing the whole apparatus over the ground and of propelling the plows may be carried on at the same time. The frame forming the track upon which the plow-carriages travel may be constructed of any suitable material, but is preferably made up of iron or steel angles or bars rigidly stayed both vertically and horizontally, so as to keep the bars upon which the wheels of the carriages run in their proper position.

Referring to Fig. 1, the frame A forms a double track having upper and lower sides and semicircular ends. At each end of the frame a sprocket-wheel, E, is fixed on a shaft free to revolve and centered at the center of the semicircular tracks. These sprocket-wheels carry an endless chain, F, to which the several plow-carriages are attached. The outer frame, B, surrounds the two semicircular ends and the under side of frame A at a distance equal to the diameter of the carriage-wheels, and thus acts as a guide to keep the wheels in position when turning around the ends and when the plows are cutting the furrows.

G represents four caster-wheels connected to and supporting, as indicated, the two beams H, which are connected to the plow-frame, as indicated. Each beam H has attached to it one triangular bracket, I, with its apex jointed to H at or nearly at its center between the caster-wheels G. The bracket I has its apex pointing downward, and one of the other points of each triangular bracket is jointed to J, which is an upright, and forms part of the plow-frame. The other point of each bracket I is connected to a screw-spindle, K, which passes through a nut, *k*, which nut is held in position by L, which forms part of the plow-frame. By this arrangement it will be seen that the beams H support the plow-frame, and are themselves carried by the caster-wheels G. It will also be seen that the beams H may rock upon the jointed apex of the bracket I, and thus any unevenness of the ground is allowed for and does not tend to distort or strain the plow-frame. At the same time the height of the plow-frame may be adjusted by turning the screw-spindle K so as to raise or lower the frame, as may be required.

Referring to Figs. 2 and 3, the method of connecting the plow-frame to the traction-engine will be seen. It is essential that this connection should be so rigid as to prevent the plow-frame from twisting out of proper position in relation to the engine, and yet so flexible as to allow the engine and plow to be used on uneven ground. With this view the connection between the engine and the plow-frame is so made as to allow for such vertical oscillation as would be caused by inequalities in the surface of the ground, and preferably consists of two rods, M, jointed on each side of the frame of the traction-engine and similarly jointed at the other ends to the plow-frame. With the view of still further preventing any twisting out of position of the plow-frame, chain-braces N are applied. These are preferably connected to each end of the axle of the traction-engine, and extend diagonally to the plow-frame, where a connection is made, as shown in Fig. 2. Suitable means of tightening these chain-braces N are provided.

I shall use the term "motor" to designate the steam-engine and gear from which the machinery derives its motion.

The shaft which carries one of the sprocket-wheels E is provided with a beveled spur-wheel, O. With this wheel the pinion P gears, which pinion is fastened on the shaft Q. On this shaft is a sprocket-wheel, R, driven by an endless chain, S, from the sprocket-wheel T, which derives a rotary motion from the motor. By the connection thus described and shown it is evident that a rotary motion is conveyed to the sprocket-wheels E when the motor is in motion, and that as the endless chain F is carried by the sprocket-wheels E the said chain will travel at a speed proportionate to the size and speed of the sprocket-wheels E.

Although a description has been given of a method of driving the sprocket-wheel E from the motor, yet I do not confine myself to this particular manner of conveying the motion, which may be done by any of the well-known mechanical movements which will make the necessary allowance for any oscillation caused by the unevenness of the ground.

Referring to Fig. 4, the construction of the plow-carriages will be understood. It consists of a frame, U, preferably made of angle-bars of iron or steel, having axles and carrying wheels V, which wheels run upon the track formed by the plow-frame. (Shown in Fig. 1.)

W is a plow-beam, jointed at one end to the hanger Y, which hanger is secured to the frame U. The other end of the plow-beam W passes through a similar bracket, X, attached to the other end of the plow-frame.

Z is a plow fastened to the beam W, and a represents a circular colter.

b is the land-wheel journaled to the bracket c, one pair of arms of which is jointed to the plow-beam, while the other pair passes under clamping-clips d, attached to the plow-beam. When it is desired that the plow Z shall follow the undulations of the ground, the land-wheel b is attached, as shown in Fig. 4, to the bracket c, so as to give whatever depth of cut may be required, the depth of cut being changed by altering the position of the pair of arms c held under the clamps d, which, it will be seen, is in all essential respects similar to the ordinary horse-plow.

The end of the plow-beam W works loose up or down within the bracket X; consequently that end of the plow-beam is supported by the land-wheel b. The other end is jointed to the hanger Y, and consequently the beam W is free to adjust itself to the undulations of the ground.

When in stubble-plowing it is desirable that the plows be held down rigidly to their work, the land-wheel b and its bracket c may be removed, and the plow-beam is then fixed to the hanger X by a pin or bolt passed through one of the holes in said bracket and through a corresponding hole in the plow-beam W. The bracket Y is braced to the frame U by diagonal braces e, which hold it in position and enable it to withstand the thrust of the plowing.

It is essential that a proper connection between the plow-carriage and the traveling chain F be made, so that while moving with the chain it may freely turn round the semicircular ends of the plow-frame track. For this purpose I provide the two bars f, which are each jointed at one end to the carriage-frame U, while the other ends extend obliquely toward the chain F, where they are connected by a pin or bolt, g, which passes through both bars f and through one of the links of the chain F. By this means a connection strong enough to propel the plow-carriage is made, yet sufficiently flexible for all the movements required.

In Fig. 1 I show six plow-carriages, constructed as shown in Fig. 4. For the purposes of this description, I may assume that these carriages are arranged ten feet apart, and that it is desired to cut a furrow fourteen inches wide. In such a case the gearing of the motor is so proportioned that while the chain F is moved ten feet the traction-engine will move forward fourteen inches. It will be evident from this that only a small portion of the total power of the engine is required for moving the whole apparatus, and consequently the larger portion of the power is available for actual plowing. From the whole arrangement and motion it will also be evident that the resistance produced by the plows cutting the furrows is thrown sidewise on the traction-engine and does not offer so much resistance to the forward motion of the engine as if the plows moved in the same direction as the engine.

The plows when working, it will be seen, commence to cut a furrow at one end of the frame and continue till at the other end they leave the ground and traveling round the semicircular end of the plow-frame reach the upper track, along which they move bottom upward to the end, where they again descend to the ground and again commence a fresh furrow.

What I claim as my invention, and desire to secure by Letters Patent, is—

1. A frame forming a track for the motion of one or more plow-carriages, in combination with beams carried on caster-wheels and connected to said frame by a pivot-joint, substantially as set forth, and for the purpose specified.

2. The beams H, supported by the caster-wheels G, in combination with the triangular brackets connected by a pivot-joint to the beams H and having one end jointed to a part of the frame, while the other end is connected to and actuated by a screw-spindle, substantially as and for the purpose specified.

3. A frame made of any suitable material, but preferably of iron or steel, arranged to form a track for the movement of plow-carriages and having semicircular ends with the frame forming a double track along the lower side and around the semicircular ends, substantially as shown, and for the purpose specified.

4. The combination of the frame A, having the double track, a carriage supported on wheels adjusted to travel on said track and having one or more plows attached to it, and an endless chain for moving said carriage, substantially as described.

5. The combination of the frame A, having the double track, a plow-carriage having a plow-beam, W, and one or more plows, and an endless chain for moving said carriage, substantially as described.

6. The combination of the frame A, having a track, an endless chain on said frame, a plow-carriage on the track of said frame, and the bars f, connecting the carriage with the endless chain, substantially as described.

EDWARD INGLETON.

Witnesses:
A. FRASER,
KATE FRASER.